United States Patent
Hsu et al.

(10) Patent No.: US 12,532,459 B2
(45) Date of Patent: Jan. 20, 2026

(54) SEMICONDUCTOR MEMORY DEVICE HAVING DIELECTRIC SPACER CONTAINING AIR GAP FORMED THERMAL DECOMPOSABLE LAYER

(71) Applicant: NANYA TECHNOLOGY CORPORATION, New Taipei (TW)

(72) Inventors: Kuo Chung Hsu, Kaohsiung (TW); En-Jui Li, New Taipei (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 405 days.

(21) Appl. No.: 18/203,820

(22) Filed: May 31, 2023

(65) Prior Publication Data
US 2024/0407155 A1     Dec. 5, 2024

(51) Int. Cl.
 *H10B 12/00*     (2023.01)
(52) U.S. Cl.
 CPC .................................. *H10B 12/485* (2023.02)
(58) Field of Classification Search
 CPC   H10B 12/0335; H10B 12/315; H10B 12/482; H10B 12/485; H01L 21/764
 See application file for complete search history.

(56) References Cited

U.S. PATENT DOCUMENTS

| | | | |
|---|---|---|---|
| 7,666,754 B2 | 2/2010 | Toma et al. | |
| 2024/0121947 A1* | 4/2024 | Kim | H10B 12/315 |

FOREIGN PATENT DOCUMENTS

TW    202137415 A    10/2021

OTHER PUBLICATIONS

J.M. Park et al., "20nm DRAM: A new beginning of another revolution", 978-1-4673-9894-7/15/IEEE, 2015.
T. Schloesser et al., "A 6F2 Buried Wordline DRAM Cell for 40nm and Beyond", DOI: 10.1109/IEDM.2008.4796820, IEEE, 2008.
Qinghua Han et al., "A DTCO approach on DRAM bit line capacitance and sensing margin Improvement" 978-1-7281-6235-5/20/IEEE, 2020.
D. Bikiaris, "Can nanoparticles really enhance thermal stability of polymers? Part II: An overview on thermal decomposition of polycondensation polymers" Elsevier B.V., Jun. 24, 2011.
Su Yanqing et al., "Research on TiH2 Thermal Decomposition for Melt Hydrogenation Process" 978-1-4244-7739-5/10, IEEE, 2010.

* cited by examiner

*Primary Examiner* — Hoai V Pham
(74) *Attorney, Agent, or Firm* — CKC & Partners Co., LLC

(57) ABSTRACT

A semiconductor memory device includes a substrate, a memory cell contact formed over the substrate, a bit line conductive structure formed over the substrate and a dielectric spacer located between the memory cell contact and the bit line conductive structure. The dielectric spacer includes an air gap having a rectangular cross-section, and the rectangular cross-section has a height H and a width W, wherein a H/W ratio is equal to or greater than 40.

18 Claims, 3 Drawing Sheets

SEMICONDUCTOR MEMORY DEVICE HAVING DIELECTRIC SPACER CONTAINING AIR GAP FORMED THERMAL DECOMPOSABLE LAYER

BACKGROUND

Field of Disclosure

The present disclosure relates to a semiconductor memory device.

Description of Related Art

An integrated circuit (IC) device (also referred to as a semiconductor chip) can contain millions of transistors and other circuit elements that are fabricated on a single silicon crystal substrate (wafer). An air gap is widely studied and used for MOSFET gap spacer to decrease a capacitance value, but less studied in a semiconductor memory device. A sacrificial layer to format an air gap in bit line spacer is used in a semiconductor memory device. However, narrow and deeper air gap formation is difficult to process due to deep oxide removing and thin nitride protection, which may cause leakage issue.

SUMMARY

The present disclosure provides semiconductor memory devices to deal with the needs of the prior art problems.

In one or more embodiments, a semiconductor memory device includes: a substrate; a memory cell contact formed over the substrate; a bit line conductive structure formed over the substrate; and a dielectric spacer located between the memory cell contact and the bit line conductive structure, wherein the dielectric spacer includes an air gap having a rectangular cross-section, and the rectangular cross-section has a height H and a width W, a H/W ratio is equal to or greater than 40.

In one or more embodiments, the dielectric spacer includes a nitride layer enclosing the air gap.

In one or more embodiments, the substrate includes an active area, and the bit line conductive structure is disposed on the active area.

In one or more embodiments, the substrate includes an active area, and the memory cell contact is disposed on the active area.

In one or more embodiments, the semiconductor memory device further includes a thermal decomposable layer retained within the air gap, wherein the thermal decomposable layer occupies less than 3% of a volume of the air gap.

In one or more embodiments, the semiconductor memory device further includes a thermal decomposable layer retained within the air gap and on a sidewall of the nitride layer.

In one or more embodiments, a semiconductor memory device includes: a substrate; a memory cell contact formed over the substrate; a bit line conductive structure formed over the substrate; a dielectric spacer located between the memory cell contact and the bit line conductive structure, wherein the dielectric spacer includes an air gap; and a byproduct of a thermal decomposable layer retained in the air gap.

In one or more embodiments, the dielectric spacer includes a nitride layer enclosing the air gap.

In one or more embodiments, the byproduct is retained on a sidewall of the nitride layer.

In one or more embodiments, the byproduct is retained at a bottom portion of the air gap.

In one or more embodiments, the byproduct is retained at a top portion of the air gap.

In one or more embodiments, the byproduct is a solid or liquid byproduct of the thermal decomposable layer.

In one or more embodiments, a semiconductor memory device includes: a substrate; a memory cell contact formed over the substrate; a bit line conductive structure formed over the substrate; a dielectric spacer located between the memory cell contact and the bit line conductive structure, wherein the dielectric spacer includes an air gap; and a thermal reside of a thermal decomposable layer retained in the air gap.

In one or more embodiments, the dielectric spacer includes a nitride layer enclosing the air gap.

In one or more embodiments, the thermal reside is retained on a sidewall of the nitride layer.

In one or more embodiments, the thermal reside is retained at a bottom portion of the air gap.

In one or more embodiments, the thermal reside is retained at a top portion of the air gap.

In one or more embodiments, the thermal reside is a solid or liquid byproduct of the thermal decomposable layer.

In sum, the semiconductor memory device disclosed herein includes a dielectric spacer containing an air gap formed by thermally decomposing a thermal decomposable layer instead of etching a sacrificial layer. Therefore, the etching process can be avoided to prevent damages on sidewalls of the two nitride layers or bit line conductive structures, thereby avoiding current leakage issues. Bit line related parasitic capacitance can be further reduced due to an airgap with a greater aspect ratio.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 2:
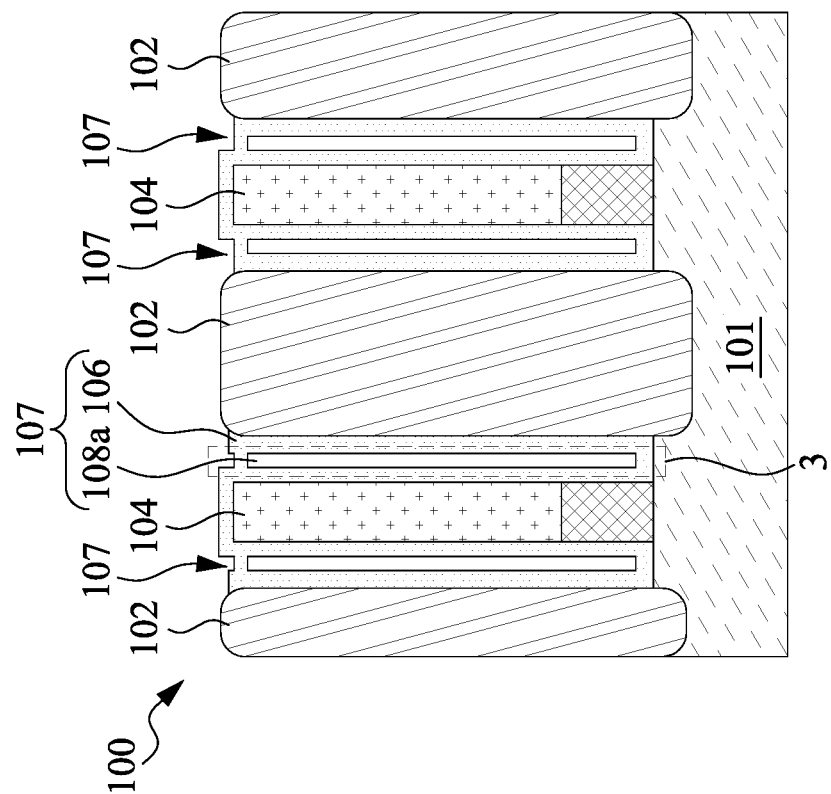
FIGS. 1-2 illustrate partial cross sections of manufacturing steps of a semiconductor memory device according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Figure 1:
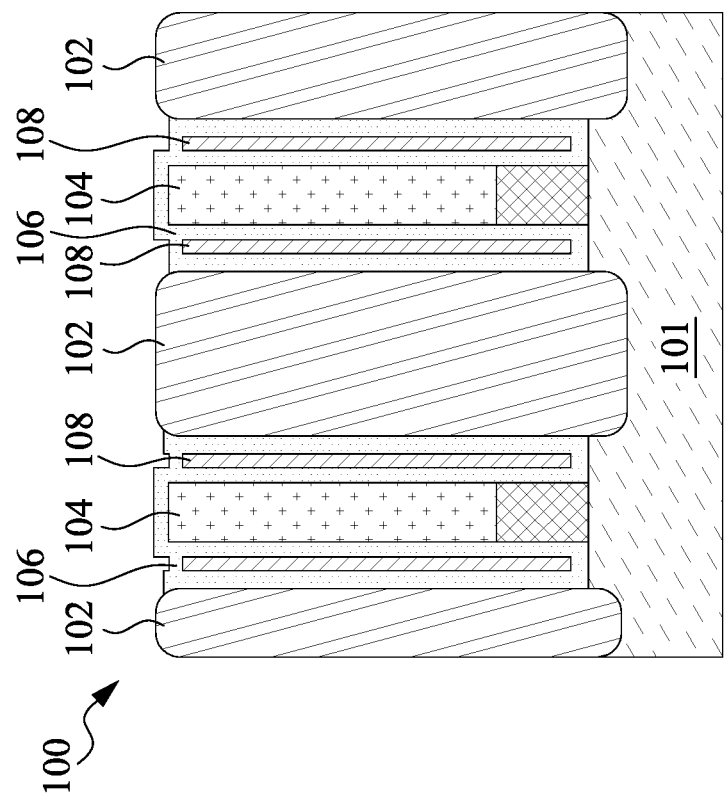

Reference is made to FIGS. 1-2, which illustrate partial cross sections of manufacturing steps of a semiconductor memory device according to some embodiments of the present disclosure. A semiconductor memory device 100 may be formed over a substrate 101. In some embodiments of the present disclosure, the substrate 101 may be a semiconductor substrate, such as a bulk semiconductor, a semiconductor-on-insulator (SOI) substrate, or the like, which may be doped (e.g., with a p-type or an n-type dopant) or undoped. The substrate 101 may be an integrated circuit die, such as a logic die, a memory die, an ASIC die, or the like. The substrate 101 may be a complementary metal oxide semiconductor (CMOS) die and may be referred to as a CMOS under array (CUA). The substrate 101 may be a wafer, such as a silicon wafer. Generally, an SOI substrate is a layer of a semiconductor material formed on an insulator layer. The insulator layer may be, for example, a buried oxide (BOX) layer, a silicon oxide layer, or the like. The insulator layer is provided on a substrate, typically a silicon or glass substrate. In some embodiments of the present disclosure, the semiconductor memory device 100 may include memory arrays formed on an active area of the substrate.

In some embodiments of the present disclosure, the semiconductor memory device 100 may include at least memory cell contacts 102, bit line conductive structures 104 and dielectric spacers 107. Each dielectric spacer 107 is located between adjacent corresponding memory cell contact 102 and bit line conductive structure 104. In some embodiments of the present disclosure, each dielectric spacer 107 includes a nitride layer 106 enclosing an air or void gap 108a. In some embodiments of the present disclosure, the memory cell contacts 102, bit line conductive structures 104 and dielectric spacers 107 are formed on the active area of the substrate. In some embodiments of the present disclosure, the nitride layer 106 may be a silicon nitride ($Si_3N_4$) layer. In some other embodiments of the present disclosure, the nitride layer 106 may include at least one of the materials: Aluminum Nitride (AlN), Barium Nitride ($Ba_3N_2$), Boron Nitride (BN), Calcium Nitride ($Ca_3N_2$), Cerium Nitride (CeN), Europium Nitride (EuN), Galium Nitride (GaN), Indium Nitride (InN), Lanthanum Nitride (LaN), Lithium Nitride ($Li_3N$), Magnesium Nitride ($Mg_3N_2$), Niobium Nitride (NbN), Strontium Nitride ($Sr_3N_2$), Tantalum Nitride (TaN), Vanadium Nitride (VN), Zinc Nitride($Zn_3N_2$), Zirconium Nitride (ZrN), and etc. In some embodiments of the present disclosure, the nitride layer 106 is formed by an atomic layer deposition (ALD) process to achieve desired film thickness. In some embodiments of the present disclosure, the nitride layer 106 may be formed, for example, by chemical vapor deposition (CVD), physical vapor deposition (PVD) or atomic layer deposition (ALD). To increase the deposition effect, the deposition may use a plasma. For example, the nitride layer 106 may be formed by, e.g., plasma enhanced CVD (PECVD) or plasma enhanced ALD (PEALD).

An air or void gap in a dielectric spacer is conventionally formed by etching a sacrificial layer (e.g., an oxide layer) between two nitride layers. Since etching the sacrificial layer may cause damages on sidewalls of the two nitride layers or bit line conductive structures, thereby causing current leakage issue.

In some embodiments of the present disclosure, a conventional sacrificial oxide layer between two nitride layers is replaced by a thermal decomposable layer 108 that thermally decomposes at a thermal decomposition temperature. The thermal decomposable layer 108 is removed by a thermal process instead of a wet or dry etching process such that damages on sidewalls of the two nitride layers or bit line conductive structures will be less likely damaged to cause current leakage issue. In some embodiments of the present disclosure, the thermal decomposable layer 108 may thermally decompose at a thermal decomposition temperature ranging from approximately 350 degrees C. to approximately 450 degrees C. such that thermally decomposing the thermal decomposable layer 108 can avoid conventional wet or dry etching processes and avoid bit line conductive structure sidewall damages. In some embodiments of the present disclosure, the thermal decomposable layer 108 is decomposed by exposing the decomposable layer to UV radiation. In some embodiments of the present disclosure, the nitride layer 106 may be etched to form an opening to expose the thermal decomposable layer 108, and exposing the decomposable layer to UV radiation directly.

In some embodiments of the present disclosure, the thermal decomposable layer 108 may include $TiH_2$. In some embodiments of the present disclosure, the thermal decomposable layer of $TiH_2$ may be decomposed by a heat rate 10° C./min and approximately 350 degrees C. temperature difference for about 35 minutes. In some embodiments of the present disclosure, the thermal decomposable layer of $TiH_2$ may be decomposed by a heat rate 20° C./min and approximately 400 degrees C. temperature difference for about 20 minutes. In some embodiments of the present disclosure, the thermal decomposable layer of $TiH_2$ may be decomposed by a heat rate 30° C./min and approximately 480 degrees C. temperature difference for about 16 minutes. In some embodiments of the present disclosure, the thermal decomposable layer of $TiH_2$ may be decomposed by a heat rate 40° C./min and approximately 475 degrees C. temperature difference for about 11.875 minutes. In some embodiments of the present disclosure, the thermal decomposable layer of $TiH_2$ may be decomposed by a heat rate 60° C./min and approximately 525 degrees C. temperature difference for about 8.75 minutes. In some embodiments of the present disclosure, the thermal decomposable layer of $TiH_2$ may be decomposed by a heat rate 80° C./min and approximately 540 degrees C. temperature difference for about 6.75 minutes.

In some embodiments of the present disclosure, the memory cell contact 102 may be formed using polysilicon or metals such as tungsten (W), aluminum (Al), titanium (Ti), cobalt (Co), silver (Ag), gold (Au), copper (Cu), nickel (Ni), chromium (Cr), hafnium (Hf), ruthenium (Ru), platinum (Pt), or alloys thereof, or the like. In some embodiments of the present disclosure, the bit line conductive structure 104 may be formed using polysilicon or metals such as tungsten (W), aluminum (Al), titanium (Ti), cobalt (Co), silver (Ag), gold (Au), copper (Cu), nickel (Ni), chromium (Cr), hafnium (Hf), ruthenium (Ru), platinum (Pt), or alloys thereof, or the like.

In some embodiments of the present disclosure, each bit line conductive structure 104 is located between adjacent corresponding memory cell contacts 102, and each dielectric spacer 107 is located between adjacent corresponding memory cell contact 102 and bit line conductive structure 104. In some embodiments of the present disclosure, the thermal decomposable layer 108 may be deposited by spin coating process, chemical vapor deposition (CVD) or atomic layer deposition (ALD). To increase the deposition effect, the deposition may use a plasma. For example, the thermal decomposable layer 108 may be formed by, e.g., plasma enhanced CVD (PECVD) or plasma enhanced ALD (PEALD).

Figure 3:
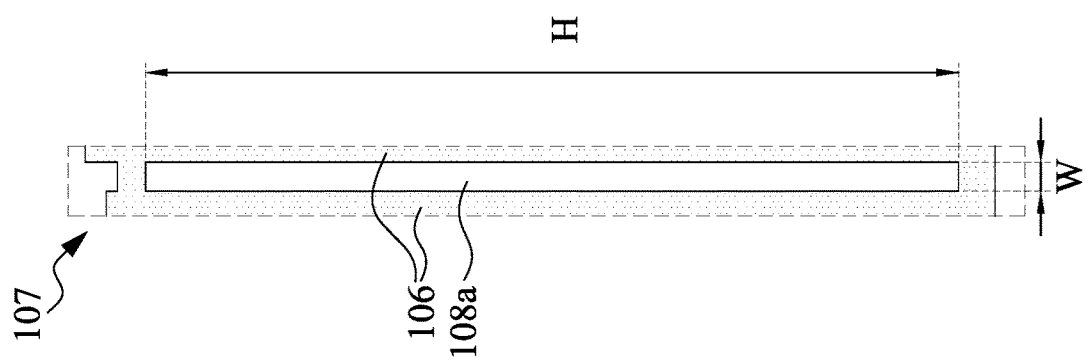
FIG. 3 illustrates a partial enlarged view of a region 3 in FIG. 2.

Reference is made to FIG. 3, which illustrates a partial enlarged view of a region 3 in FIG. 2. In some embodiments of the present disclosure, each dielectric spacer 107 may include an air gap 108a with a rectangular cross-section. The rectangular cross-section has a height H and a width W, an aspect ratio (i.e., H/W ratio) is equal to or greater than 40. When the air gap 108a has a H/W ratio equal to or greater than 40, it means that the air gap 108a is too narrow and deep to perform an etching process. It is difficult to use conventional wet or dry etching processes to properly form a gap or trench between two adjacent nitride layers 106 that has a H/W ratio equal to or greater than 40.

Figure 4:
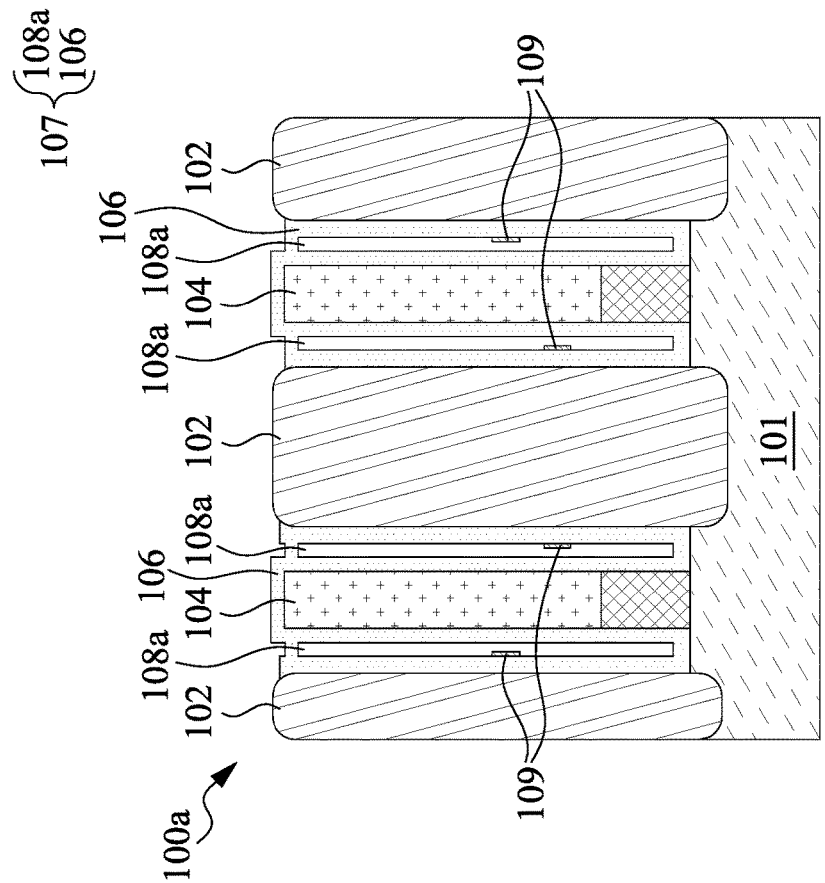
FIG. 4 illustrates a partial cross section of a semiconductor memory device 100*a* according to some embodiments of the present disclosure.

Reference is made to FIG. 4, which illustrates a partial cross section of a semiconductor memory device 100a according to some embodiments of the present disclosure. The semiconductor memory device 100a may include at least memory cell contacts 102, bit line conductive structures 104 and dielectric spacers 107. Each dielectric spacer 107 is located between adjacent corresponding memory cell contact 102 and bit line conductive structure 104. In some embodiments of the present disclosure, each dielectric spacer 107 includes a nitride layer 106 enclosing an air or void gap 108a. The air or void gap 108a is formed by thermally processing the thermal decomposable layer 108 up to a thermal decomposition temperature such that the thermal decomposable layer 108 is almost decomposed to form the air or void gap. In some embodiments of the present disclosure, the thermal decomposable layer 108 is decomposed by exposing the decomposable layer to UV radiation. The temperature required to thermally decompose the thermal decomposable layer 108 can vary depending upon the chemical composition of the decomposable layer, and the dimensions of the decomposable layer. In some embodiments of the present disclosure, a byproduct or thermal reside 109 of the thermal decomposable layer 108 may be retained on inner sidewalls of the nitride layer 106 after decomposing the thermal decomposable layer 108. In some embodiments of the present disclosure, the byproduct or thermal reside 109 of the thermal decomposable layer 108 is a solid or liquid byproduct or thermal reside retained on inner sidewalls of the nitride layer 106. In some embodiments of the present disclosure, the thermal decomposable layer 108 should be decomposed until the byproduct or thermal reside 109 of the thermal decomposable layer 108 occupies less than 3% of a volume of the air gap 108a.

Figure 5:
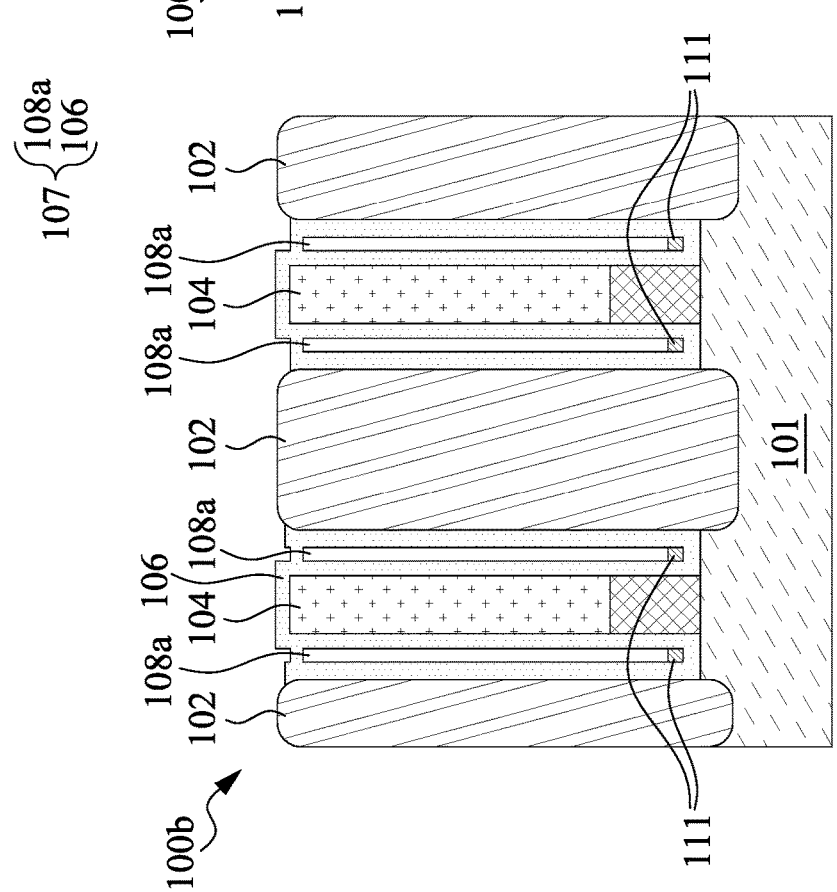
FIG. 5 illustrates a partial cross section of a semiconductor memory device 100*b* according to some embodiments of the present disclosure.

Reference is made to FIG. 5, which illustrates a partial cross section of a semiconductor memory device 100b according to some embodiments of the present disclosure. The semiconductor memory device 100b may include at least memory cell contacts 102, bit line conductive structures 104 and dielectric spacers 107. Each dielectric spacer 107 is located between adjacent corresponding memory cell contact 102 and bit line conductive structure 104. In some embodiments of the present disclosure, each dielectric spacer 107 includes a nitride layer 106 enclosing an air or void gap 108a. The air or void gap 108a is formed by thermally processing the thermal decomposable layer 108 up to a thermal decomposition temperature such that the thermal decomposable layer 108 is almost decomposed to form the air or void gap. In some embodiments of the present disclosure, the thermal decomposable layer 108 is decomposed by exposing the decomposable layer to UV radiation. The temperature required to thermally decompose the thermal decomposable layer 108 can vary depending upon the chemical composition of the decomposable layer, and the dimensions of the decomposable layer. In some embodiments of the present disclosure, a byproduct or thermal reside 111 of the thermal decomposable layer 108 may be retained at a bottom portion of the air gap 108a after decomposing the thermal decomposable layer 108. In some embodiments of the present disclosure, the byproduct or thermal reside 111 of the thermal decomposable layer 108 is a solid or liquid byproduct or thermal reside retained at the bottom portion of the air gap 108a. In some embodiments of the present disclosure, the thermal decomposable layer 108 should be decomposed until the byproduct or thermal reside 111 of the thermal decomposable layer 108 occupies less than 3% of a volume of the air gap 108a.

Figure 6:
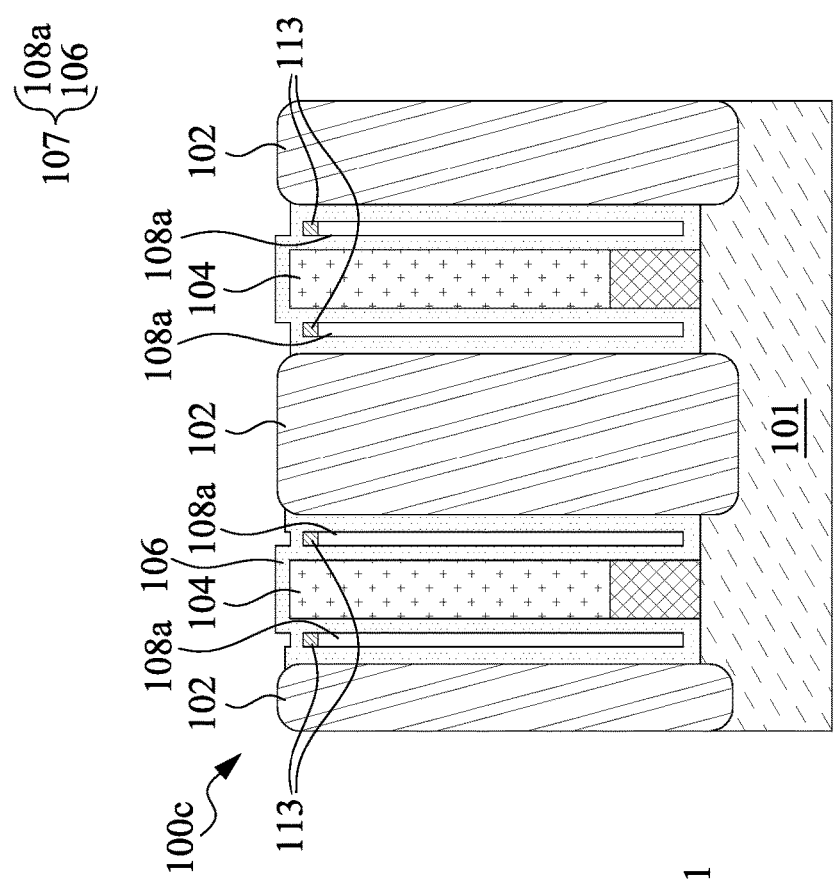
FIG. 6 illustrates a partial cross section of a semiconductor memory device 100*c* according to some embodiments of the present disclosure.

Reference is made to FIG. 6, which illustrates a partial cross section of a semiconductor memory device 100c according to some embodiments of the present disclosure. The semiconductor memory device 100c may include at least memory cell contacts 102, bit line conductive structures 104 and dielectric spacers 107. Each dielectric spacer 107 is located between adjacent corresponding memory cell contact 102 and bit line conductive structure 104. In some embodiments of the present disclosure, each dielectric spacer 107 includes a nitride layer 106 enclosing an air or void gap 108a. The air or void gap 108a is formed by thermally processing the thermal decomposable layer 108 up to a thermal decomposition temperature such that the thermal decomposable layer 108 is almost decomposed to form the air or void gap. In some embodiments of the present disclosure, the thermal decomposable layer 108 is decomposed by exposing the decomposable layer to UV radiation. The temperature required to thermally decompose the thermal decomposable layer 108 can vary depending upon the chemical composition of the decomposable layer, and the dimensions of the decomposable layer. In some embodiments of the present disclosure, a byproduct or thermal reside 113 of the thermal decomposable layer 108 may be retained at a top portion of the air gap 108a after decomposing the thermal decomposable layer 108. In some embodiments of the present disclosure, the byproduct or thermal reside 113 of the thermal decomposable layer 108 is a solid or liquid byproduct or thermal reside retained at the top portion of the air gap 108a. In some embodiments of the present disclosure, the thermal decomposable layer 108 should be decomposed until the byproduct or thermal reside 113 of the thermal decomposable layer 108 occupies less than 3% of a volume of the air gap 108a.

In some embodiments of the present disclosure, a small portion (e.g., occupying less than 3% of a volume of the air gap 108a) of the thermal decomposable layer 108 may be retained at the top portion or the bottom of the air gap 108a or on inner sidewalls of the nitride layer 106.

In sum, the semiconductor memory device disclosed herein includes a dielectric spacer containing an air gap formed by thermally decomposing a thermal decomposable layer instead of etching a sacrificial layer. Therefore, the etching process can be avoided to prevent damages on sidewalls of the two nitride layers or bit line conductive structures, thereby avoiding current leakage issues. Bit line related parasitic capacitance can be further reduced due to an airgap with a greater aspect ratio.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A semiconductor memory device comprising:
a substrate;
a memory cell contact formed over the substrate;
a bit line conductive structure formed over the substrate;
a dielectric spacer disposed between the memory cell contact and the bit line conductive structure, wherein the dielectric spacer comprises an air gap having a rectangular cross-section, the rectangular cross-section has a height H and a width W, a H/W ratio is equal to or greater than 40, the dielectric spacer comprises a nitride layer enclosing the air gap; and
a thermal decomposable layer disposed within the air gap and on a sidewall of the nitride layer.

2. The semiconductor memory device of claim 1, wherein the substrate comprises an active area, and the bit line conductive structure is disposed on the active area.

3. The semiconductor memory device of claim 1, wherein the substrate comprises an active area, and the memory cell contact is disposed on the active area.

4. The semiconductor memory device of claim 1, wherein the thermal decomposable layer occupies less than 3% of a volume of the air gap.

5. A semiconductor memory device comprising:
a substrate;
a memory cell contact formed over the substrate;
a bit line conductive structure formed over the substrate; and
a dielectric spacer disposed between the memory cell contact and the bit line conductive structure, wherein the dielectric spacer comprises an air gap; and
a byproduct of a thermal decomposable layer disposed in the air gap.

6. The semiconductor memory device of claim 5, wherein the dielectric spacer comprises a nitride layer enclosing the air gap.

7. The semiconductor memory device of claim 6, wherein the byproduct is disposed on a sidewall of the nitride layer.

8. The semiconductor memory device of claim 6, wherein the byproduct is disposed at a bottom portion of the air gap.

9. The semiconductor memory device of claim 6, wherein the byproduct is disposed at a top portion of the air gap.

10. The semiconductor memory device of claim 6, wherein the byproduct occupies less than 3% of a volume of the air gap.

11. The semiconductor memory device of claim 5, wherein the byproduct is a solid or liquid byproduct of the thermal decomposable layer.

12. A semiconductor memory device comprising:
a substrate;
a memory cell contact formed over the substrate;
a bit line conductive structure formed over the substrate; and
a dielectric spacer disposed between the memory cell contact and the bit line conductive structure, wherein the dielectric spacer comprises an air gap; and
a thermal reside of a thermal decomposable layer disposed in the air gap.

13. The semiconductor memory device of claim 12, wherein the dielectric spacer comprises a nitride layer enclosing the air gap.

14. The semiconductor memory device of claim 13, wherein the thermal reside is disposed on a sidewall of the nitride layer.

15. The semiconductor memory device of claim 13, wherein the thermal reside is disposed at a bottom portion of the air gap.

16. The semiconductor memory device of claim 13, wherein the thermal reside is disposed at a top portion of the air gap.

17. The semiconductor memory device of claim 13, wherein the thermal reside occupies less than 3% of a volume of the air gap.

18. The semiconductor memory device of claim 12, wherein the thermal reside is a solid or liquid reside of the thermal decomposable layer.

* * * * *